Feb. 5, 1957  F. E. BACHMAN  2,780,316
BRAKE HEAD ASSEMBLY
Filed March 20, 1952
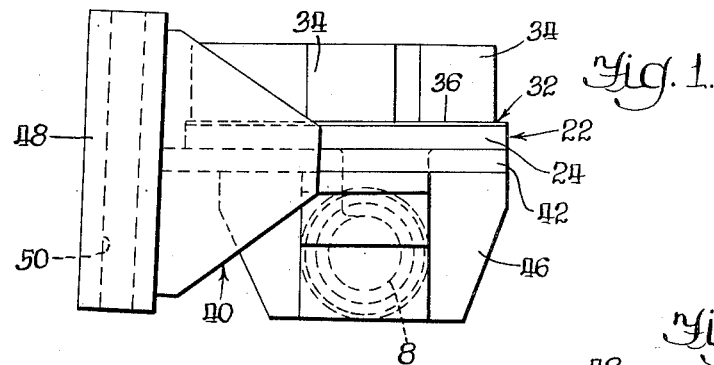
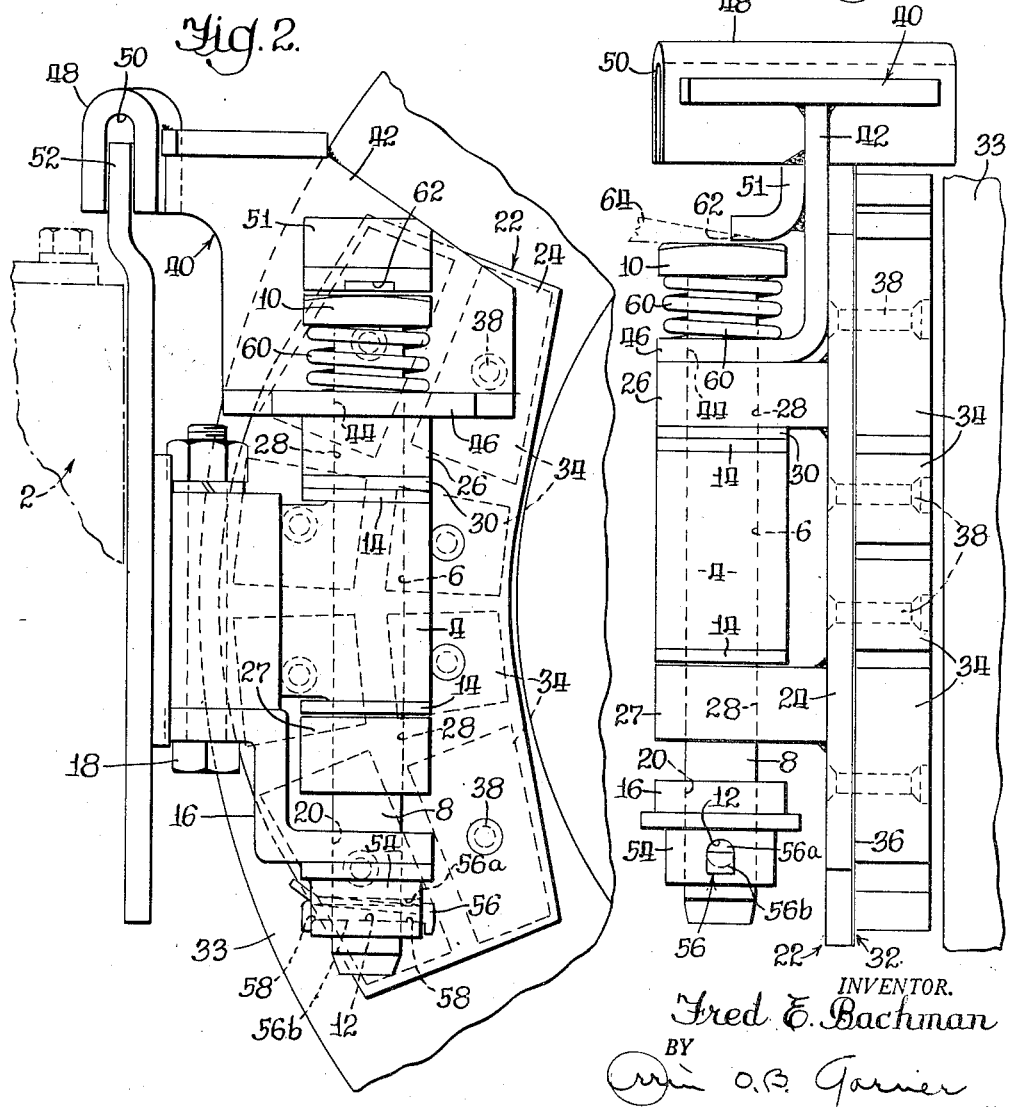
INVENTOR.
Fred E. Bachman
BY O. B. Garnier
Atty

United States Patent Office 2,780,316
Patented Feb. 5, 1957

2,780,316

BRAKE HEAD ASSEMBLY

Fred E. Bachman, Granite City, Ill., assignor to American Steel Foundries, Chicago, Ill., a corporation of New Jersey Application March 20, 1952, Serial No. 277,678

10 Claims. (Cl. 188—59)

This invention relates to brake equipment for railway cars and is more particularly concerned with the provision of a brake head assembly for an off-wheel brake arrangement embodying braking means for decelerating one or more disks or rotors secured to a wheel and axle assembly, as disclosed in copending applications Serial No. 104,453, filed July 13, 1949, in the name of Carl E. Tack now Patent No. 2,661,818; and Serial No. 211,515, filed February 17, 1951, in the name of William J. Casey now Patent No. 2,690,237; and Serial No. 276,370, filed March 13, 1952, in the name of Carl E. Tack, now Patent No. 2,702,102.

Briefly, the present invention comprises a brake head assembly pivotally mounted upon the end of a brake lever for movement into and out of braking engagement with a disk or rotor, the lever being pivotally mounted on a housing enclosing a suitable mechanism for actuating the lever, and a brake head assembly being provided with a guide member for sliding engagement along a guide tongue on the housing responsive to pivotal movement of the lever.

When a worn brake shoe is to be replaced by a new brake shoe in this type of equipment, it is necessary to disconnect the brake head from the brake lever by removing a pivot pin. The present invention contemplates the provision of a sub-assembly construction comprising a pivot pin, guide member and compression spring adapted to be removed and replaced as a single unit to save time and prevent loss of parts.

This invention further contemplates the provision of a brake head assembly in which a helical compression spring is engaged between the head of a pivot pin and a guide member to form a sub-assembly in which the several parts are interconnected to prevent disassembly.

This invention further contemplates the provision of a sub-assembly in which the pivot pin and spring are secured to the guide member by means of a lug provided on said member to engage the head of the pin, the lug serving to maintain the spring under compression during interchange of brake heads and also serving as an abutment for a tool during assembly of a brake head on a lever.

This invention embodies other novel features, details of construction and arrangement of parts which are hereinafter set forth in the specification and claims and illustrated in the accompanying drawing, wherein:

Figure 1 is a top plan view illustrating a brake head assembly embodying features of the present invention;

Figure 2 is a side elevational view of same, and

Figure 3 is an end view of same.

Referring now to the drawing for a better understanding of the present invention, the brake head assembly is shown as applied to a brake arrangement comprising a housing 2 adapted to be secured to a truck frame (not shown) of a railway car to house a double acting cartridge type cylinder which may be of the type disclosed in Patent to Tack No. 2,355,122 in which a pair of pistons are mounted in the cylinder for movement responsive to fluid pressure to actuate a pair of brake levers pivotally mounted intermediate their ends on the housing.

The brake head assembly is shown as comprising a brake lever 4 pivotally mounted on the housing 2 and formed at its outer end with a cylindrical bore 6 to slidably receive a pivot pin 8 formed with a square head 10 and a locking pin aperture 12. If desired, flanged bearing bushings 14—14 may be press-fitted in opposite ends of the bore 6 to receive the pivot pin. A bearing bracket 16 is secured to the lever 4 by means of a bolt 18 and is formed with an aperture 20 to receive the lower end of the pivot pin.

A brake head 22 comprises a flat plate 24 having spaced lugs 26—27 disposed to straddle the end of the brake lever 4, the lugs having apertures 28—28 to slidably receive the pivot pin 8. If desired, the lug 26, or both of the lugs, may be provided with a flanged bearing bushing 30 press-fitted in its aperture 28 to receive the pivot pin. As illustrated in Figure 2, the brake head is generally crescent shape and provided with a brake shoe 32 of similar contour to maintain full face braking engagement with a rotor 33 when the latter moves vertically relative thereto, as disclosed in my copending application Serial No. 274,196, filed February 29, 1952.

In the present construction it is contemplated that a worn brake shoe shall be removed and discarded and replaced by a new brake shoe which is shown as comprising a plurality of blocks of friction material 34 bonded to a thin metal backing plate 36, the brake shoe being secured to the brake head 22 by means of rivets 38. It will be understood that a worn brake shoe may be removed from its brake head by removing the rivets.

A guide member 40 is shown as comprising a body 42 adapted to be positioned in flush engagement against the back face of the brake head 22 and secured in such position by means of the pivot pin 8 which is disposed in an aperture 44 formed in a flange 46 provided on said body. An inverted U-shaped portion 48 is provided on the body 42 to define a channel 50 to slidably receive a guide tongue 52 provided on the housing 2, said portion and tongue coacting to maintain the brake shoe and head in proper braking engagement with the rotor, as more particularly described in said application Serial No. 211,515 now Patent No. 2,690,237. A stop lug 51 is welded to the body 42 above the pin head 10 to prevent disassembly of the guide member 40 from the pivot pin 8.

The pivot pin 8 is secured against upward movement relative to the lever 4 by means of a sleeve 54 secured to the pin by a wedge key 56 inserted through the pin aperture 12 and aligned apertures 58 in the sleeve. The wedge key may be of the type disclosed in a copending application Serial No. 18,740, filed April 3, 1948, in the name of Robert Cottrell, now Patent No. 2,589,781, comprising a gib 56a and key 56b formed with opposed wedge surfaces coacting to move a sleeve axially of a pin during mounting of the key through the pin aperture 12 and sleeve apertures 58 to thus further compress a spring 60. When the several parts of the brake head assembly are connected together in the manner shown and described, the helical spring 60, interposed between the pin head 10 and guide member flange 46, is under compression and acts to move the pin head upwardly away from the lug 26 and to engage the sleeve 54 against the bearing bracket 16.

To replace a worn brake shoe, the brake head 22 is disconnected from the lever 4 by removing the key 56 and then moving the pivot pin axially until it has been withdrawn from the bores in bearing bracket 16, lugs 26 and 27 and lever. After removal of the pivot pin it will be noted that the guide member 40 and spring 60 are connected thereto by means of the stop lug 51, with the spring compressed, to thus facilitate reassembly of the head on the lever and to reduce the possibility of loss of parts.

To further facilitate reassembly of the brake head on the lever, the stop lug 51 is formed with a wedge surface 62 disposed at an angle to the top of the pivot pin head 10 for engagement by a wedge-shaped tool 64 to urge the head toward the stop lug 26 and move the aperture 12 into position to receive either a wedge key 56 or a cylindrical pin to secure the sleeve 54 to the pin.

While this invention has been shown in but one form it is obvious to those skilled in the art that it is not so limited but is susceptible of various changes and modifications without departing from the spirit and scope of the claimed invention.

I claim:

1. In a brake head assembly, a brake lever, a brake head having spaced lugs straddling said lever, a guide member having a body portion engaged against the brake head, a flange on said body portion engaging one of said lugs, said lever, lugs and flange having aligned apertures, a pivot pin extending through said apertures and having a head spaced from said flange, a spring sleeved over said pin and compressed between said flange and said pin head, abutment means including a sleeve secured on said pin, means engageable by said sleeve to prevent movement of said pin head away from said flange to maintain said spring under compression, and a stop lug on said body portion engageable by said pin head during movement of the latter away from said flange upon removal of the sleeve from said pin.

2. In a brake head assembly, a brake lever, a brake head having spaced lugs straddling said lever, a guide member having a body portion engaged against the brake head, a flange on said body portion engaging one of said lugs, said lever, lugs and flange having aligned apertures, a pivot pin extending through said apertures and having a head spaced from said flange, a spring sleeved over said pin and compressed between said flange and said pin head, abutment means including a sleeve secured on said pin, means engageable by said sleeve to prevent movement of said pin head away from said flange to maintain said spring under compression, and a stop lug on said body portion engageable by said pin head during movement of the latter away from said flange upon removal of the sleeve from said pin, said stop lug having a wedge surface angularly disposed from the adjacent surface of said pin head for engagement by a wedge tool to move the pin head toward said flange to compress said spring.

3. In a device of the class described, a retainer member having a flange formed with an aperture, a pivot pin mounted in said aperture and having a head on one end thereof, a spring sleeved over said pin between said flange and said head, and a lug on said member limiting movement of said head away from said flange to maintain said member, pivot pin and spring in assembled relation.

4. In a brake head assembly, a guide member having a flange formed with an aperture, a pivot pin mounted in said aperture and having a head on one end thereof, a spring sleeved over said pin and compressed between said flange and said head, and a lug on said guide member limiting movement of said head away from said flange to maintain said guide member, pivot pin and spring in assembled relation.

5. In a brake head assembly, a guide member having a flange formed with an aperture, a pivot pin mounted in said aperture and having a head on one end thereof, a spring sleeved over said pin and compressed between and engaging said flange and said head, and a lug on said guide member limiting movement of said head away from said flange to maintain said guide member, pivot pin and spring in assembled relation, adjacent sides of said lug and head presenting angularly disposed surfaces adapted to receive a wedge tool therebetween to compress said spring.

6. In a brake head assembly including a lever and a brake head pivotally mounted thereon, a guide member engaging said brake head against movement relative thereto and having a flange, a pivot pin pivotally connecting said brake head and flange to said lever and having a head at one end thereof spaced from said flange, a spring sleeved over said pin and compressed between and engaging said pin head and flange, a sleeve secured on the other end of said pin preventing movement of said pin head away from said flange, and a lug on said member limiting movement of said pin head away from said flange upon removal of said sleeve.

7. In a brake head assembly including a lever and a brake head pivotally mounted thereon, a guide member engaging said brake head against movement relative thereto and having a flange, a pivot pin pivotally connecting said brake head and flange to said lever and having a head at one end thereof spaced from said flange, a spring sleeved over said pin and compressed between said pin head and flange, a sleeve secured on the other end of said pin preventing movement of said pin head away from said flange, and a lug on said member limiting movement of said pin head away from said flange upon removal of said sleeve, said lug having a wedge surface inclined from the adjacent surface of said pin head, said surfaces being disposed to receive a wedge therebetween to move the pin head toward said flange.

8. A brake head assembly comprising a brake lever, a brake head having lugs straddling said lever, a pivot pin pivotally connecting said lugs to said lever, said pin having one end formed with a head and its other end formed with an aperture, a guide member provided on said brake head for common movement therewith and having an apertured flange sleeved over said pin and engaging one of said lugs, a sleeve having holes in registry with said aperture, a locking pin mounted in said holes and aperture to lock said sleeve on the pivot pin, means engaged by said sleeve to prevent movement of said pin head away from said flange, a spring compressed between and engaging said pin head and flange to urge the latter into tight frictional engagement with the adjacent lug, and a stop lug fixed on said guide member and engageable with said pin head and having a wedge surface inclined from the adjacent outer face of the pin head, said surface and face being disposed to receive a wedge therebetween to further compress said spring during mounting and removal of the sleeve to space the sleeve from said means and thus facilitate insertion and removal of the locking pin in said holes and aperture.

9. A brake head assembly comprising a brake lever, a brake head having lugs straddling said lever, a pivot pin pivotally connecting said lugs to said lever, said pin having one end formed with a head and its other end formed with an aperture, a guide member provided on said brake head for common movement therewith and having an apertured flange sleeved over said pin and engaging one of said lugs, a sleeve having holes in registry with said aperture, a locking pin mounted in said holes and aperture to lock said sleeve on the pivot pin, means engaged by said sleeve to prevent movement of said pin head away from said flange, a spring compressed between and engaging said pin head and flange to urge the latter into tight frictional engagement with the adjacent lug, and a stop lug fixed on said guide member and engageable with said pin head and having a wedge surface inclined from the adjacent outer face of the pin head, said surface and face being disposed to receive a wedge therebetween to further compress said spring during mounting and removal of the sleeve to space the sleeve from said means and thus facilitate insertion and removal of the locking pin in said holes and aperture, said means comprising a bracket secured to said lever and bored to receive said pivot pin.

10. A brake head and lever assembly comprising a brake head member, a lever member, a pin extending through aligned openings of said members, said pin having a head, a spring compressed against one side of said pin head, a spring abutment compressed by said spring against one of said members, a head abutment connected to the spring abutment against movement away from the latter, the distance between said abutments being less than the free height of said spring, an abutment on the other member, and means carried by said pin in engagement with said last mentioned abutment to hold said pin head in spaced relationship with respect to said head abutment and thereby transmit reaction of said spring against said one member to said last mentioned abutment.

References Cited in the file of this patent

UNITED STATES PATENTS

| | | |
|---|---|---|
| 2,355,121 | Tack et al. | Aug. 8, 1944 |
| 2,380,803 | Tack | July 31, 1945 |
| 2,589,781 | Cottrell | Mar. 18, 1952 |
| 2,590,062 | Bachman | Mar. 18, 1952 |
| 2,603,009 | Smith | July 15, 1952 |
| 2,655,226 | Tack et al. | Oct. 13, 1953 |
| 2,702,102 | Tack | Feb. 15, 1955 |